(12) United States Patent
Freeck et al.

(10) Patent No.: US 9,972,184 B2
(45) Date of Patent: May 15, 2018

(54) SYSTEMS AND METHODS FOR MONITORING A VEHICLE OPERATOR AND FOR MONITORING AN OPERATING ENVIRONMENT WITHIN THE VEHICLE

(71) Applicant: STATE FARM MUTUAL AUTOMOBILE INSURANCE COMPANY, Bloomington, IL (US)

(72) Inventors: Jason Freeck, Gurnee, IL (US); Alex Ewing Ford, Chicago, IL (US); Paul Sloan, Byron, IL (US); Ryan Thomas Schmidt, Bloomington, IL (US); Mihir Dilip Angal, San Jose, CA (US); Neel Kothari, Aurora, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 1 day.

(21) Appl. No.: 14/339,652

(22) Filed: Jul. 24, 2014

(65) Prior Publication Data
US 2016/0027276 A1  Jan. 28, 2016

(51) Int. Cl.
  *G08B 21/02* (2006.01)
  *B60R 16/037* (2006.01)

(52) U.S. Cl.
  CPC .......... *G08B 21/02* (2013.01); *B60R 16/037* (2013.01)

(58) Field of Classification Search
  CPC .......... B60K 31/0008; B60K 31/0058; B60K 28/06; B60R 25/00; B60R 25/04; B60R 25/2081; B60R 25/302; B60R 25/305; B60R 2300/8006; B60R 2021/01311; G06F 17/5095; G06F 17/5018; G08G 1/096888; G08G 1/096827; G08G 1/096838; G08G 1/096844; G08G 1/096872; G07C 5/085;
  (Continued)

(56) References Cited

U.S. PATENT DOCUMENTS 7,565,230 B2 *  7/2009  Gardner et al. ............. 701/32.7
7,639,148 B2 * 12/2009  Victor ......................... 340/576
(Continued)

*Primary Examiner* — Steven Lim
*Assistant Examiner* — Mancil Littlejohn, Jr.
(74) *Attorney, Agent, or Firm* — Marshall, Gerstein & Borun LLP; Randall G. Rueth

(57) ABSTRACT

The present disclosure generally relates to systems and methods for monitoring a vehicle operator and for monitoring the environment of a vehicle operator. In particularly, the present disclosure relates to systems and methods for determining a physical position of an operator within a vehicle and for determining environmental conditions surrounding the vehicle operator. The systems may include at least one of: an image sensor, an infrared sensor, an ultrasonic sensor, a microphone or a combination or sub-combination thereof. The methods may determine a position and/or an orientation of a vehicle operator's head, arms, hands, legs, feet, etc., a combination thereof or a sub-combination thereof. The methods may generate a warning when a position of the vehicle operator is inappropriate, such as when the vehicle operator has not looked in front of the vehicle for an extended period of time when the vehicle is travelling forward, when the vehicle operator is looking at a cellular telephone, when the vehicle operator has been looking downward for an extended period of time, etc.

20 Claims, 6 Drawing Sheets

(58) Field of Classification Search
CPC .............. G08B 21/00; B60G 2800/98; B60G 2800/87; B60G 2800/704; B60T 2220/02
USPC ............. 340/426.1, 426.11, 426.19, 426.25, 340/426.32, 575, 576, 439, 435, 457.1; 701/1, 36, 51, 70; 455/345, 556.2
See application file for complete search history.

(56) References Cited

U.S. PATENT DOCUMENTS

| | | | | |
|---|---|---|---|---|
| 8,384,534 | B2* | 2/2013 | James | B60Q 9/008 340/435 |
| 8,487,775 | B2* | 7/2013 | Victor | A61B 3/113 180/272 |
| 8,698,639 | B2* | 4/2014 | Fung et al. | 340/576 |
| 8,742,936 | B2* | 6/2014 | Galley et al. | 340/576 |
| 8,816,836 | B2* | 8/2014 | Lee et al. | 340/439 |
| 2002/0135618 | A1* | 9/2002 | Maes | G06F 3/0481 715/767 |
| 2004/0139034 | A1* | 7/2004 | Farmer | G06Q 30/0283 705/400 |
| 2012/0197669 | A1* | 8/2012 | Kote | G06Q 10/10 705/4 |
| 2014/0257873 | A1* | 9/2014 | Hayward | G07C 5/00 705/4 |
| 2015/0098609 | A1* | 4/2015 | Sarratt | G06K 9/6282 382/103 |

* cited by examiner

SYSTEMS AND METHODS FOR MONITORING A VEHICLE OPERATOR AND FOR MONITORING AN OPERATING ENVIRONMENT WITHIN THE VEHICLE

FIELD OF INVENTION

The present disclosure generally relates to systems and methods for monitoring a vehicle operator and for monitoring the environment of a vehicle operator. In particularly, the present disclosure relates to systems and methods for determining a physical position of an operator within a vehicle and for determining environmental conditions surrounding the vehicle operator.

BACKGROUND

Every year many vehicle accidents are caused by inattentive drivers. One common form of inattentiveness is texting while driving. Another common form of impaired driving is distracted driving. Modern vehicles come equipped with any number of distractions including stereos, air-conditioners, navigation systems, etc. Furthermore, a vehicle operator can be distracted by another passenger or by articles the vehicle operator brings into the vehicle (e.g., a mobile telephone, a newspaper, a magazine, a book, etc.). When a vehicle driver takes his eyes off the road for even a second while driving, the results can be disastrous.

Various sensors, such as infrared sensors, image sensors, ultrasonic sensors, etc., are available that provide data representative of objects proximate the sensor. Computer systems may, for example, generate three dimensional (3D) models based on data acquired from such sensors.

Generating a 3D model of at least a portion of a vehicle driver is desirable. The 3D model of at least a portion of a vehicle driver may be compared to a 3D model of at least a portion of a model vehicle operator to detect when the vehicle driver is being inattentive to the task of driving. Generating a warning or an advisory to notify the vehicle driver of her detected inattentiveness is desirable. Furthermore, tracking the inattentiveness and attentiveness of vehicle drivers is desirable to perform insurance risk assessment.

SUMMARY

A computer implemented method for generating data representative of a position of at least a portion of a vehicle driver within an interior of a vehicle and data representative of an operating environment within the vehicle is provided. The method may include acquiring, from one or more data sources, model data, wherein the model data is representative of a model of at least a portion of the interior of the vehicle including at least a portion of a model vehicle operator. The method may further include acquiring, from one or more position sensors, vehicle driver position data, wherein the vehicle driver position data is representative of a position of at least a portion of a vehicle driver within the interior of the vehicle. The method may also include comparing the vehicle driver position data with the model data to determine a difference between the vehicle driver position data and the model data, wherein the difference between the vehicle driver position data and the model data are indicative of a deviation of a position of at least a portion of the vehicle driver from a position of at least a portion of the model vehicle operator.

In an embodiment, a system for generating data representative of a position of at least a portion of a vehicle driver within an interior of a vehicle and data representative of an operating environment within the vehicle is provided. The system may include a model data acquisition module stored on a memory that, when executed by a processor, causes the processor to acquire model data, wherein the model data is representative of a model of at least a portion of the interior of the vehicle including at least a portion of a model vehicle operator. The system may also include a position data acquisition module stored on a memory that, when executed by a processor, causes the processor to acquire position data, wherein the position data is representative of a position of at least a portion of a vehicle driver within the interior of the vehicle. The system may further include a comparison module stored on a memory that, when executed by a processor, causes the processor to compare the position data with the model data to determine differences between a vehicle driver position and a model vehicle operator position, wherein the differences between the vehicle driver position and the model vehicle operator position are indicative of a deviation of a position of at least a portion of the vehicle driver from a position of at least a portion of the model vehicle operator.

In another embodiment, a tangible, computer-readable medium storing instructions that when executed by a process of a computer system cause the computer system to generate data representative of a position of at least a portion of a vehicle driver within an interior of a vehicle and data representative of an operating environment within the vehicle is provided. The tangible, computer-readable medium may include a model data acquisition module that, when executed by a processor, causes the processor to acquire model data, wherein the model data is representative of a model of at least a portion of the interior of the vehicle including at least a portion of a model vehicle operator. The tangible, computer-readable medium may further include a position data acquisition module that, when executed by a processor, causes the processor to acquire position data, wherein the position data is representative of a position of at least a portion of a vehicle driver within the interior of the vehicle. The tangible, computer-readable medium may also include a comparison module that, when executed by a processor, causes the processor to compare the position data with the model data to determine differences between a vehicle driver position and a model vehicle operator position, wherein the differences between the vehicle driver position and the model vehicle operator position are indicative of a deviation of a position of at least a portion of the vehicle driver from a position of at least a portion of the model vehicle operator.

BRIEF DESCRIPTION OF THE DRAWINGS

The figures described below depict various aspects of the systems and methods disclosed herein. It should be understood that each figure depicts an embodiment of a particular aspect of the disclosed systems and methods, and that each of the figures is intended to accord with a possible embodiment thereof. Further, wherever possible, the following description refers to the reference numerals included in the following figures, in which features depicted in multiple figures are designated with consistent reference numerals.

DETAILED DESCRIPTION

Vehicle drivers often spend too little time focused on the roads and too much time focused on their smartphones or other technological devices. This lack of attention to the road results in accidents, injuries, and deaths. The systems and methods of the present disclosure may quantitatively determine where a vehicle driver was looking at the time of an accident. As a result, dangerous driving behavior may be used in determining the cost of insurance. Moreover, data obtained by the systems and methods of the present disclosure may be used to advise a driver how to improve their driving habits.

Hands free devices and Bluetooth technologies are being developed that allow people to increase the time their focus on the road while using related cellular telephones, vehicle navigation systems and other electronic devices. Sensors, such as infrared sensors, image sensors, ultrasonic sensors, microphones, etc., placed inside of a vehicle may be used to track a host of driver behavioral metrics, such as gaze tracking, to ensure the driver is focused on the road, in-car gesture tracking, to ensure that drivers are focused on behaviors conducive to driving rather than other activities, and tracking vehicle interior sound volume which can become distracting at high levels. Driver behavioral metrics may indicate the amount of attention the driver is giving the road. Additionally, the systems and methods of the present disclosure may incorporate an on-face camera that the user wears. An on-face camera may provide direct access to what a vehicle driver is looking at, allowing for better monitoring of their driving habits.

A vehicle driver may be advised to change their driving habits for their own safety based on the determined driver behavioral metrics. For example, a warning or an advisory may be provided to a vehicle driver when a potentially detrimental behavioral metric is determined. Alternatively, insurance rates may be adjusted based on the determined driver behavioral metrics.

Figure 1A:
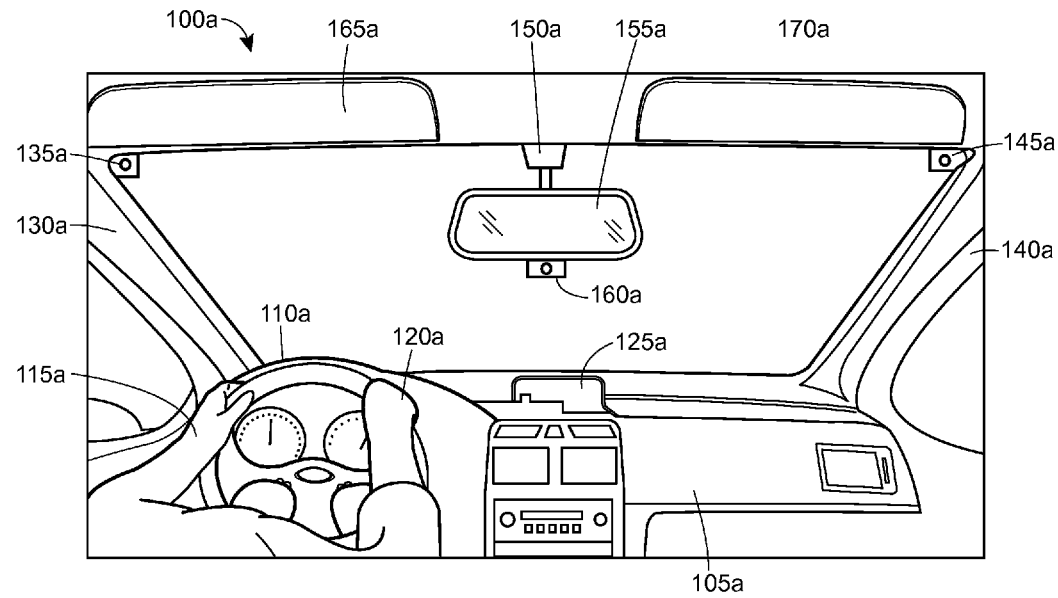
FIGS. 1A-1C depict various views of the interior of an example vehicle that illustrate locations of vehicle operator monitoring devices within the vehicle.
Figure 1B:
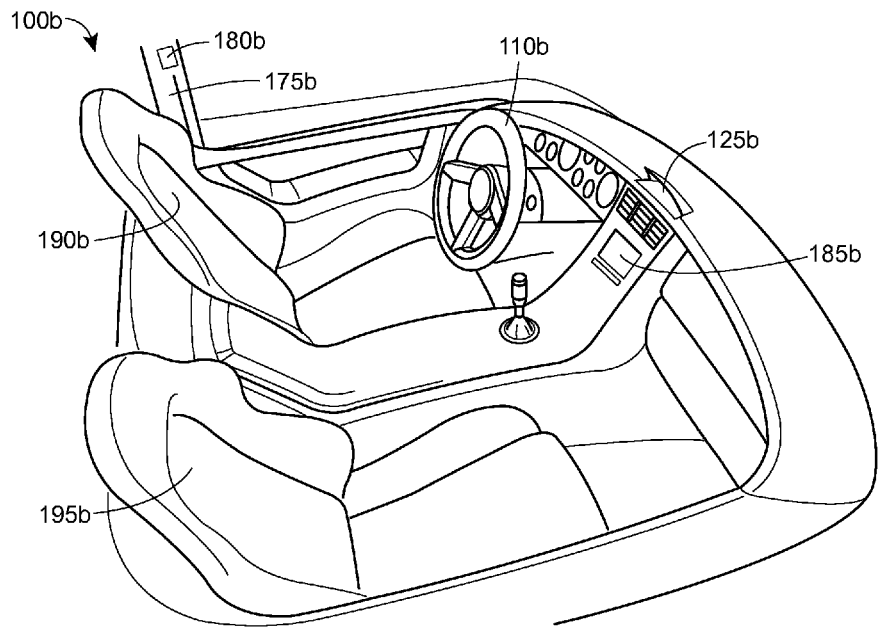
Figure 1C:
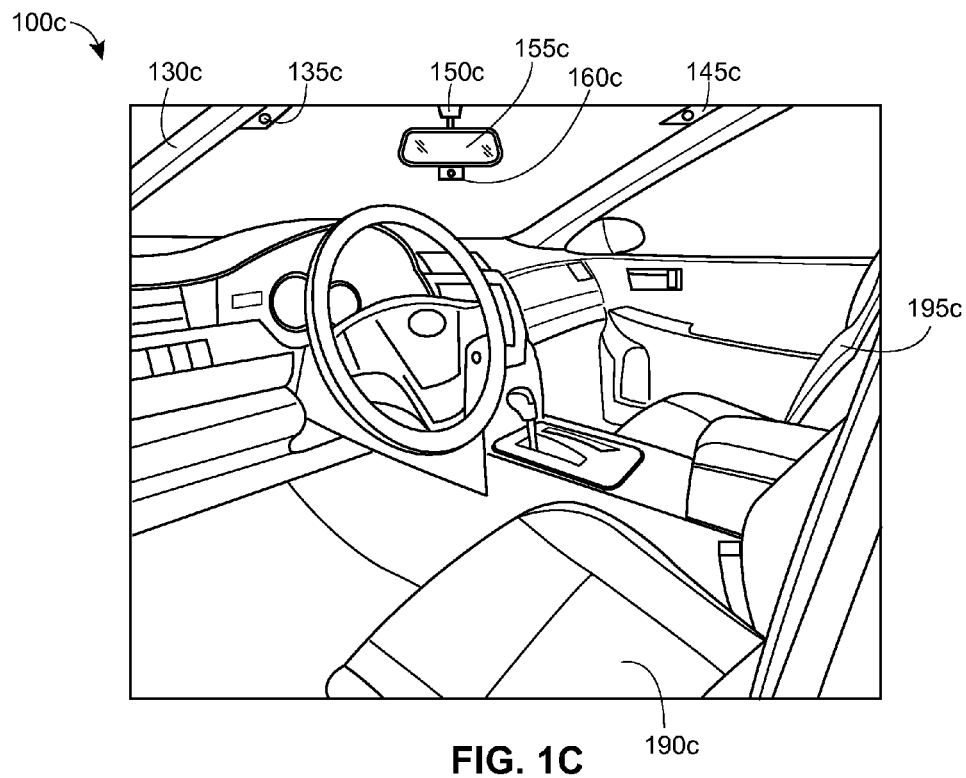

Turning to FIGS. 1A-1C, vehicle interior monitoring systems 100a, 100b, 100c are illustrated. As depicted in FIG. 1A, the vehicle interior monitoring system 100a may include a center-dash position sensor 125a located in a center area of the dash, a driver-side A-pillar position sensor 135a located in a driver side A-pillar 130a, a passenger-side A-pillar position sensor 145a located in a passenger-side A-pillar 140a and a rearview mirror position sensor 160a located on a bottom-side of the rearview mirror 155a. The vehicle interior monitoring system 100a may further, or alternatively, include position sensors in a driver-side visor 165a, a passenger-side visor 170a, a rearview mirror mounting bracket 150a and, or the steering wheel 110a. As described in detail herein, a position of a left-hand 115a of a vehicle driver and, or a position of a right-hand 120a of the vehicle driver, relative to a vehicle steering wheel 110a may be determined based on data acquired from any one of the position sensors 125a, 135a, 145a, 160a. Any one of the position sensors 125a, 135a, 145a, 160a may be an image sensor, an infrared sensor, an ultrasonic sensor, a microphone or any other suitable position sensor.

With reference to FIG. 1B, the vehicle monitoring system 100b may include a driver-side B-pillar position sensor 180b located in a driver-side B-pillar 175b and a center-dash position sensor 125b located in a center area of the dash. While not shown in FIG. 1B, the vehicle monitoring system 100b may include a passenger-side B-pillar position sensor and, or any other position sensors as described in conjunction with FIG. 1A. The vehicle monitoring system 100b may further include a display device 185b. The display device 185b may be located in a center-console area. As illustrated in FIG. 1B, data acquired from the position sensors 125b, 180b may be used to determine a position of a driver-side seat 190b, a passenger-side seat 195b, a steering wheel 110b and, or at least a portion of a vehicle driver (not shown in FIG. 1B).

Turning to FIG. 1C, the vehicle interior monitoring system 100c may include a driver-side A-pillar position sensor 135c located in a driver side A-pillar 130c, a passenger-side A-pillar position sensor 145c located in a passenger-side A-pillar 140c and a rearview mirror position sensor 160c located on a bottom-side of the rearview mirror 155c. The vehicle interior monitoring system 100c may further, or alternatively, include position sensors in a rearview mirror mounting bracket 150c and, or the steering wheel 110c. While not shown in FIG. 1C, the vehicle monitoring system 100c may include any other position sensors as described in conjunction with FIGS. 1A and 1B. As illustrated in FIG. 1C, data acquired from the position sensors 135c, 145c may be used to determine a position of a driver-side seat 190c, a passenger-side seat 195c, a steering wheel 110c and, or at least a portion of a vehicle driver (not shown in FIG. 1C).

Figure 2A:
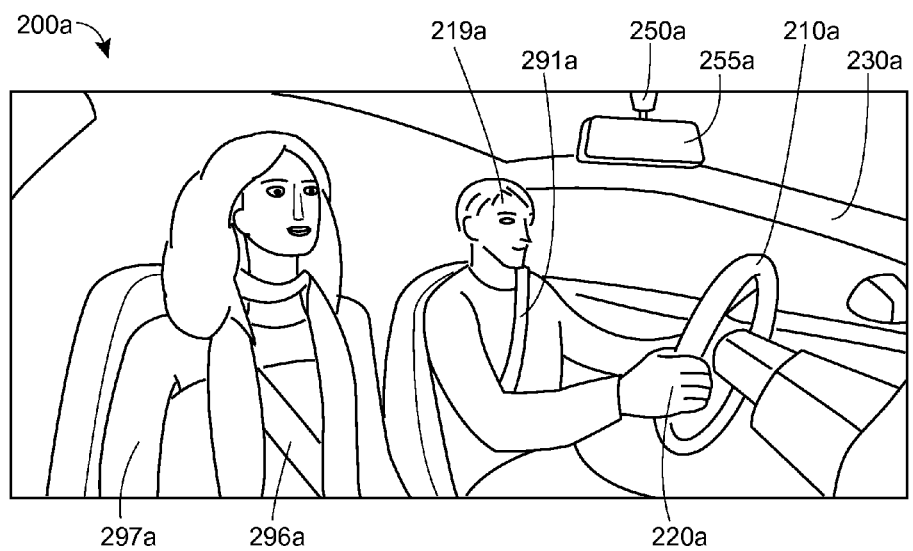
FIGS. 2A-2C illustrate various example images constructed from data retrieved from the vehicle monitoring devices of FIGS. 1A-1C.
Figure 2B:
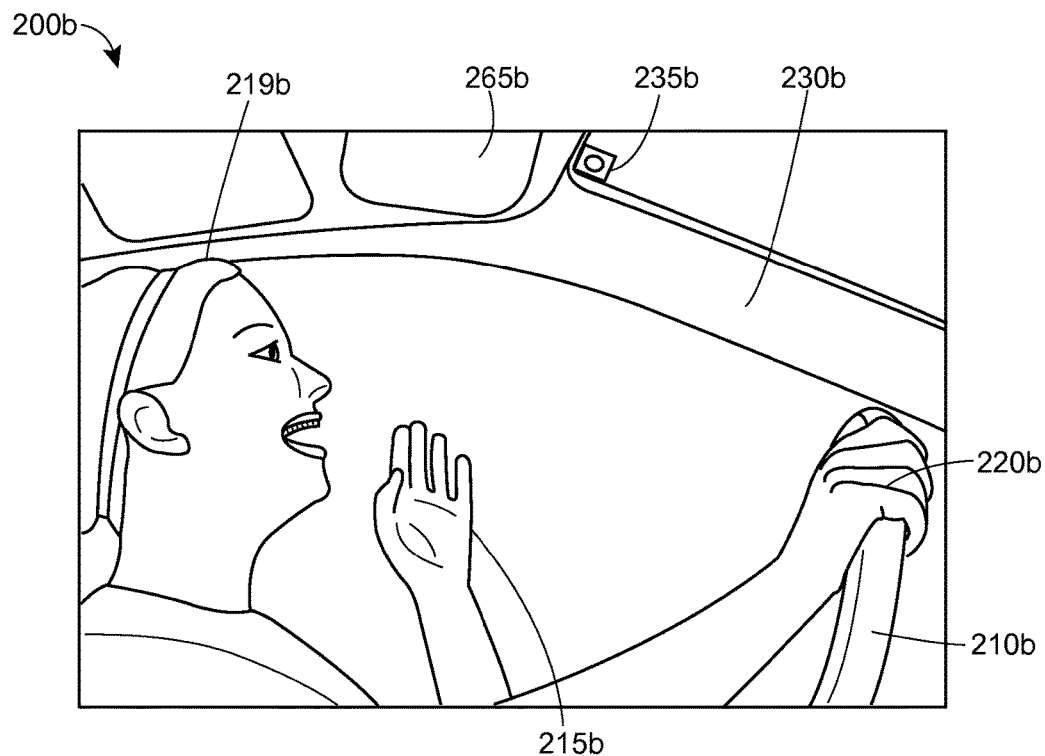
Figure 2C:
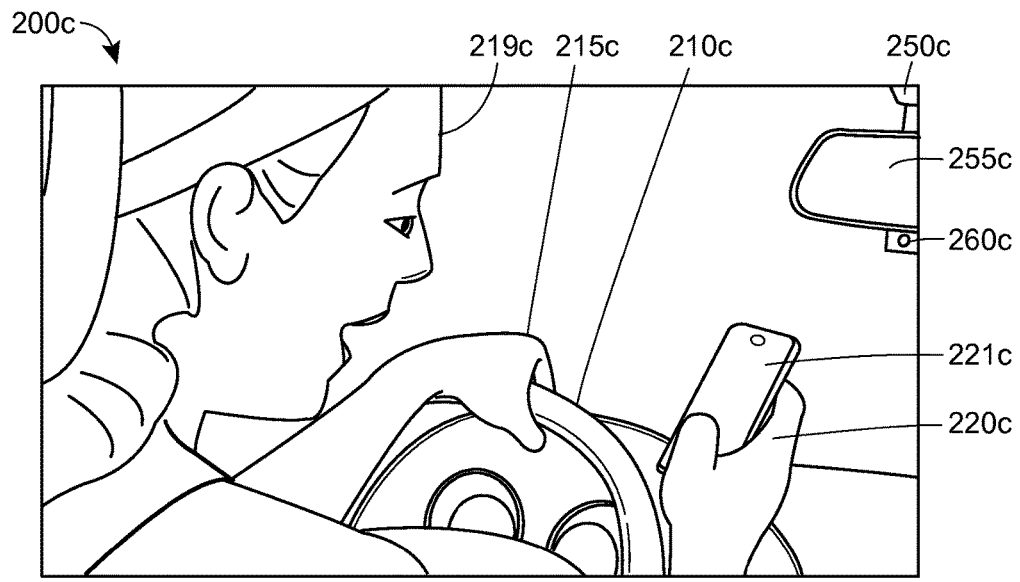

With reference to FIGS. 2A-2C, vehicle interiors 200a, 200b, 200c are depicted. As described in detail herein, data acquired from the position sensors 125a, 135a, 145a, 160a, 180b of FIGS. 1A and 1B (or any other suitably located position sensors) may be used to determine a position of at least a portion of a passenger 297a within the vehicle interior 200a. The data acquired from the position sensors 125a, 135a, 145a, 160a, 180b (or any other suitably located position sensors) may be used to determine whether, or not the passenger 297a is wearing a seatbelt 296a. As further illustrated in FIG. 2A, data acquired from the position sensors 125a, 135a, 145a, 160a, 180b of FIGS. 1A and 1B (or any other suitably located position sensors) may be used to determine a position and, or orientation of a vehicle driver's head 219a and, or right-hand 220a on a steering wheel 210a. For example, the data acquired from the position sensors 125a, 135a, 145a, 160a, 180b may be used to determine whether the vehicle driver's head 219a is oriented toward a rearview mirror 255a, oriented toward the driver-side A-pillar 230a or oriented toward the front windshield. The data acquired from the position sensors 125a, 135a, 145a, 160a, 180b may be used to determine whether the driver is wearing a seatbelt 291a. In any event, the vehicle interior 200*a* may include a microphone 250*a* located proximate the rearview mirror 255*a*. As described in detail herein, data acquired from the microphone 250*a* may be used to determine a source of sound within the vehicle interior 200*a* and, or a volume of the sound.

FIG. 2B depicts a vehicle interior 200*b* including a driver-side A-pillar position sensor 235*b* located on a driver-side A-pillar 230*b*. As described in detail herein, data acquired from the position sensor 235*b* (along with any other suitably located position sensors) may be used to determine a position and, or orientation of a driver's head 219*b*, the driver's left hand 215*b* and, or right hand 220*b* relative to the steering wheel 210*b*. For example, data acquired from the position sensor 235*b* (along with any other suitably located position sensors) may be used to determine a gesture that the driver is performing with her left hand 215*b*.

Turning to FIG. 2C, a vehicle interior 200*b* depicts a position sensor 260*c* located on a bottom side of a rearview mirror 255*c* opposite a rearview mirror mount 250*c*. As described in detail herein, data acquired from the sensor 260*c* (along with any other suitably located position sensors) may be used to determine a position and, or orientation of a driver's head 219*c*, the driver's left hand 215*c* and, or right hand 220*c* relative to the steering wheel 210*c*. For example, data acquired from the position sensor 260*c* (along with any other suitably located position sensors) may be used to determine that the driver's head 219*c* is oriented toward a cellular telephone 221*c* in her right hand 220*c*. As also described in detail herein, a determination may be made that the driver is inattentive to the road based on the driver's head 219*c* being oriented toward the cellular telephone 221*c*.

Figure 3:
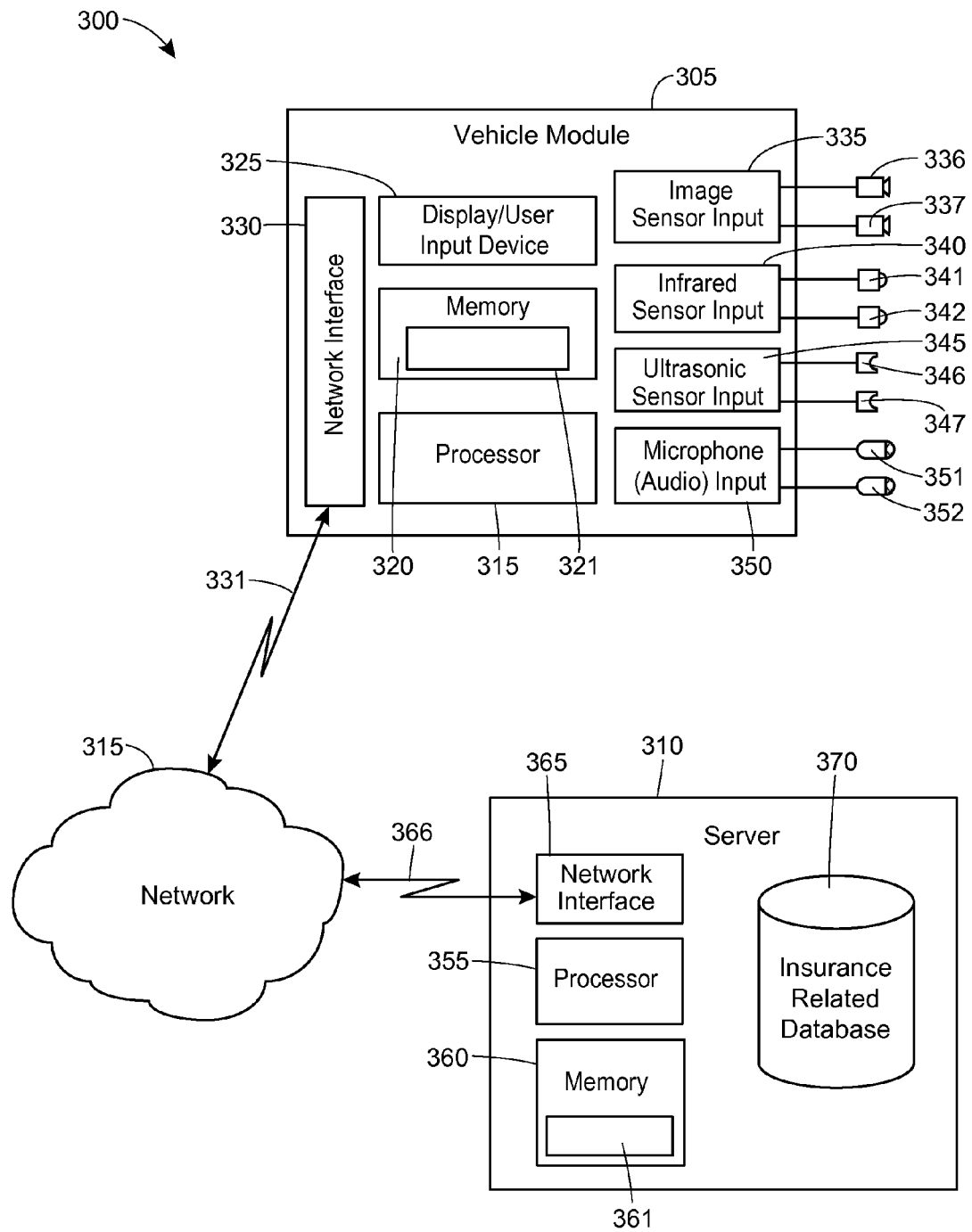
FIG. 3 illustrates a block diagram of a computer network, a computer server and an on-board vehicle computer on which an exemplary vehicle operator monitoring system and method may operate in accordance with the described embodiments.

With reference to FIG. 3, a high-level block diagram of an insurance risk related data collection system 300 is illustrated that may implement communications between a vehicle module 305 and a remote computing device 310 to provide vehicle interior occupant position data and, or vehicle interior sound data to an insurance related database 370. For example, the insurance risk related data collection system 300 may acquire data from position sensors (e.g., position sensors 125*a*, 135*a*, 145*a*, 160*a*, 180*b* of FIGS. 1A and 1B) and generate three dimensional (3D) models of vehicle interiors and occupants as depicted in FIGS. 2A-2C. The insurance risk related data collection system 300 may also acquire data from a microphone (e.g., microphone 250*a* of FIG. 2A) and determine a source of sound and volume of sound within a vehicle interior.

For clarity, only one vehicle module 305 is depicted in FIG. 3. While FIG. 3 depicts only one vehicle module 305, it should be understood that any number of vehicle modules 305 may be supported. The vehicle module 305 may include a memory 320 and a processor 325 for storing and executing, respectively, a module 321. The module 321, stored in the memory 320 as a set of computer-readable instructions, may be related to a vehicle interior and occupant position data collecting application that, when executed on the processor 325, causes vehicle position data to be stored in the memory 320. Execution of the module 321 may also cause the process 325 to generate at least one 3D model of at least a portion of a driver within the vehicle interior. Execution of the module 321 may further cause the processor 325 to associate the position data with a time and, or date. Execution of the module 321 may further cause the processor 325 to communicate with the processor 355 of the remote computing device 310 via the network interface 330, the vehicle module communications network connection 331 and the wireless communication network 315.

The vehicle module 305 may further include an image sensor input 335 communicatively connected to a first image sensor 336 and a second image sensor 337. While two image sensors 336, 337 are depicted in FIG. 3, any number of image sensors may be included within a vehicle interior monitoring system and may be located within a vehicle interior as depicted in FIGS. 1A-1C. The vehicle module 305 may also include an infrared sensor input 340 communicatively connected to a first infrared sensor 341 and a second infrared sensor 342. While two infrared sensors 341, 342 are depicted in FIG. 3, any number of infrared sensors may be included within a vehicle interior monitoring system and may be located within a vehicle interior as depicted in FIGS. 1A-1C. The vehicle module 305 may further include an ultrasonic sensor input 345 communicatively connected to a first ultrasonic sensor 346 and a second ultrasonic sensor 347. While two ultrasonic sensors 346, 347 are depicted in FIG. 3, any number of ultrasonic sensors may be included within a vehicle interior monitoring system and may be located within a vehicle interior as depicted in FIGS. 1A-1C. The vehicle module 305 may also include a microphone input 350 communicatively connected to a first microphone 351 and a second microphone 352. While two microphones 351, 352 are depicted in FIG. 3, any number of microphones may be included within a vehicle interior monitoring system and may be located within a vehicle interior as depicted in FIGS. 1A-1C. The vehicle module 305 may further include a display/user input device 325.

As one example, a first image sensor 336 may be located in a driver-side A-pillar (e.g., location of position sensor 135*a* of FIG. 1A), a second image sensor 337 may be located in a passenger-side A-pillar (e.g., location of position sensor 145*a* of FIG. 1A), a first infrared sensor 341 may be located in a driver-side B-pillar (e.g., location of position sensor 180*b* of FIG. 1B), a second infrared sensor 342 may be located in a passenger-side B-pillar (not shown in the Figs.), first and second ultrasonic sensors 346, 347 may be located in a center portion of a vehicle dash (e.g., location of position sensor 125*a* of FIG. 1A) and first and second microphones 351, 352 may be located on a bottom portion of a vehicle interior rearview mirror (e.g., location of position sensor 160*a* of FIG. 1A). The processor 315 may acquire position data from any one of, or all of, these sensors 336, 337, 341, 342, 346, 347, 351, 352 and generate at least one 3D model (e.g., a 3D model of at least a portion of a vehicle driver) based on the position data. The processor 315 may transmit data representative of at least one 3D model to the remote computing device 310. Alternatively, the processor 315 may transmit the position data to the remote computing device 310 and the processor 355 may generate at least one 3D model based on the position data. In either event, the processor 315 or the processor 355 retrieve data representative of a 3D model vehicle operator and compare the data representative of the 3D model of at least a portion of the vehicle driver with data representative of at least a portion of the 3D model vehicle operator. The processor 315 and, or the processor 355 may generate a vehicle driver warning based on the comparison of the data representative of the 3D model of at least a portion of the vehicle driver with data representative of at least a portion of the 3D model vehicle operator to warn the vehicle operator that his position is indicative of inattentiveness. Alternatively, the processor 315 and, or the processor 355 may generate an advisory based on the comparison of the data representative of the 3D model of at least a portion of the vehicle driver with data representative of at least a portion of the 3D model vehicle operator to advise the vehicle operator how to correct her position to improve attentiveness.

The network interface 330 may be configured to facilitate communications between the vehicle module 305 and the remote computing device 310 via any hardwired or wireless communication network 315, including for example a wireless LAN, MAN or WAN, WiFi, the Internet, or any combination thereof. Moreover, the vehicle module 305 may be communicatively connected to the remote computing device 310 via any suitable communication system, such as via any publicly available or privately owned communication network, including those that use wireless communication structures, such as wireless communication networks, including for example, wireless LANs and WANs, satellite and cellular telephone communication systems, etc. The vehicle module 305 may cause insurance risk related data to be stored in a remote server 310 memory 360 and/or a remote insurance related database 370.

The remote computing device 310 may include a memory 360 and a processor 355 for storing and executing, respectively, a module 361. The module 361, stored in the memory 360 as a set of computer-readable instructions, facilitates applications related to collecting insurance risk related data. The module 361 may also facilitate communications between the computing device 310 and the vehicle module 305 via a network interface 365, a remote computing device network connection 366 and the network 315 and other functions and instructions.

The computing device 310 may be communicatively coupled to an insurance related database 370. While the insurance related database 370 is shown in FIG. 3 as being communicatively coupled to the remote computing device 310, it should be understood that the insurance related database 370 may be located within separate remote servers (or any other suitable computing devices) communicatively coupled to the remote computing device 310. Optionally, portions of insurance related database 370 may be associated with memory modules that are separate from one another, such as a memory 320 of the vehicle module 305.

Figure 4:
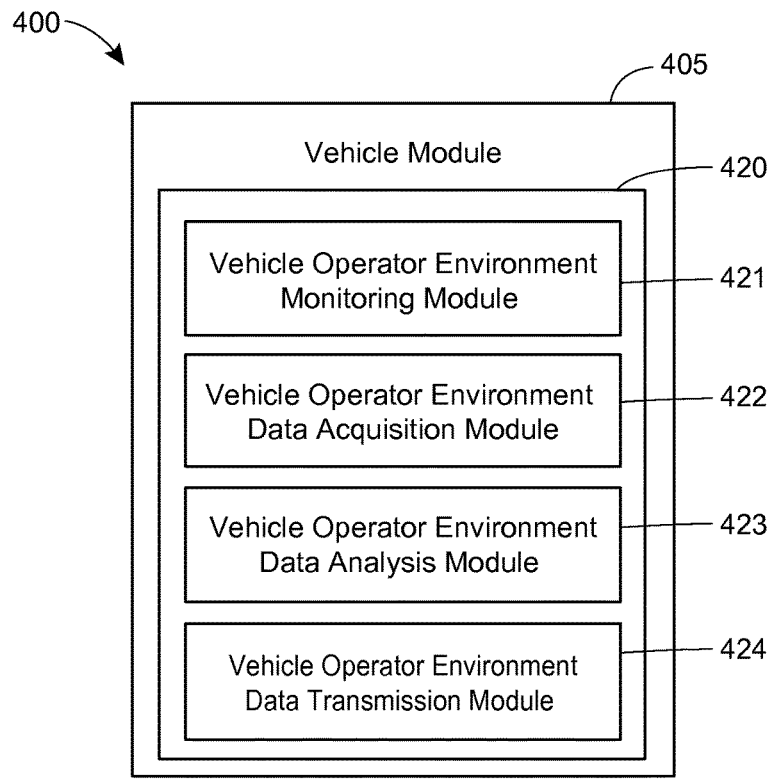
FIG. 4 illustrates a block diagram of an exemplary vehicle module for use in acquiring, analyzing and transmitting vehicle operator monitoring data.
Figure 5:
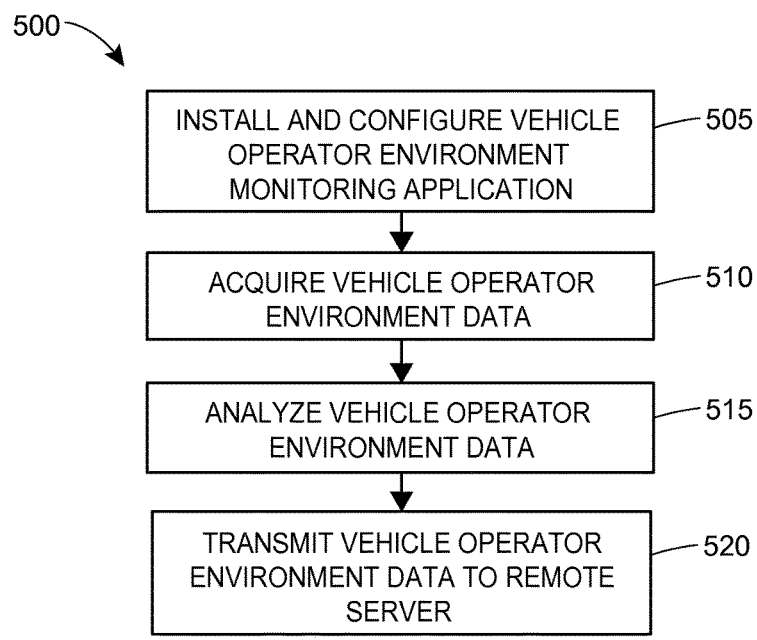
FIG. 5 depicts a flow diagram of an example method of acquiring, analyzing and transmitting vehicle operator monitoring data.

Turning to FIGS. 4 and 5, a vehicle module 405 of an insurance risk related data collection system 400 is depicted along with a method of establishing an insurance risk related data file on the vehicle module 405 and, or transmitting insurance risk related data to a remote server 310. The vehicle module 405 may be similar to the vehicle module with insurance application 305 of FIG. 3. The method 500 may be implemented by executing the modules 421-424 on a processor (e.g., processor 315). In any event, the vehicle module 405 may include a vehicle operator environment monitoring module 421, a vehicle operator environment data acquisition module 422, a vehicle operator environment data analysis module 423 and a vehicle operator environment data transmission module stored in a memory 420. The processor 315 may execute the vehicle operator environment monitoring module 421 to, for example, cause the processor 315 to receive data representative of a 3D model vehicle operator (block 505). The data representative of the 3D model vehicle operator may have been generated, for example, in conjunction with a vehicle safety study and may reflect an ideal position and orientation of a vehicle driver's head and hands. For example, the data representative of a 3D model vehicle operator may indicate that the vehicle operator's left hand is grasping a steering wheel near a minus forty-five degree angle relative to a top of the steering wheel and the vehicle operator's right hand is grasping the steering wheel near a positive forty-five degree angle relative to the top of the steering wheel. Additionally, the data representative of a 3D model vehicle operator may indicate that the vehicle operator's head is oriented such that the operator is looking forward out the front windshield of an associated vehicle. Alternatively, the data representative of the 3D model vehicle operator may reflect a sequence of positions of the model vehicle operator. For example, the 3D model vehicle operator may reflect that the operator is periodically scanning the rearview mirrors while most often looking forward out the front windshield of an associated vehicle.

The processor 315 may execute the vehicle operator environment data acquisition module 422 to acquire position data from various position sensors (e.g., image sensors 336, 337, infrared sensors 341, 342, ultrasonic sensors 346, 347) and, or sound data from various microphones (e.g., microphones 351, 352) (block 510). For example, the processor 315 may acquire data from the position sensors that is indicative of a position and, or orientation of a vehicle driver's head and, or at least one of the vehicle driver's hands. The processor 315 may also acquire data from at least one microphone that is indicative of a source of sound within a vehicle interior and, or the volume of sound within the vehicle interior.

The processor 315 may execute the vehicle operator environment data analysis module 423 to determine a position of at least a portion of a vehicle driver (block 515) based on the acquired position data. For example, the processor 315 may generate a 3D model of at least a portion of a vehicle driver based on the data acquired from at least one position sensor 336, 337, 341, 342, 346, 347. The processor 315 may also generate a warning to the vehicle driver based on a comparison of a 3D model of at least a portion of the vehicle driver and at least a portion of a 3D model vehicle operator. Furthermore, the processor 315 may determine a source and, or volume of sound within the vehicle interior based on data received from at least one microphone 351, 352. The processor 315 may also generate a warning to the vehicle driver based on the data representative of the sound within the vehicle interior.

The processor 315 may execute the vehicle operator environment data transmission module 424 to transmit vehicle interior position and, or vehicle interior sound data to a remote computing device (block 520). For example, the processor 315 may transmit position data and, or sound data to a remote computing device 310. Alternatively, the processor 315 may transmit data to the remote computing device 310 that is representative of a 3D model of at least a portion of a vehicle driver.

Figure 6:
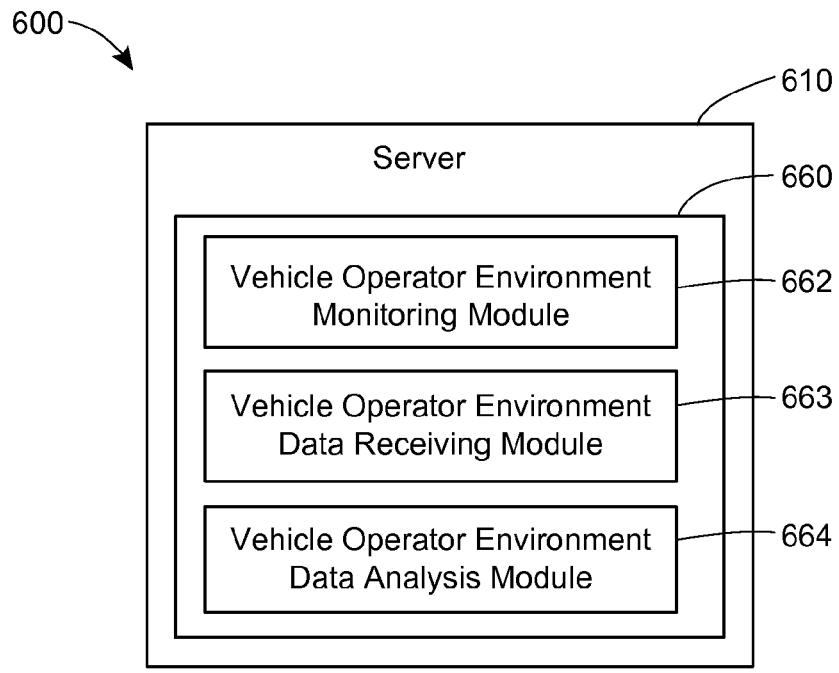
FIG. 6 illustrates a block diagram of an exemplary remote server for use in receiving, analyzing and storing vehicle operator monitoring data.
Figure 7:
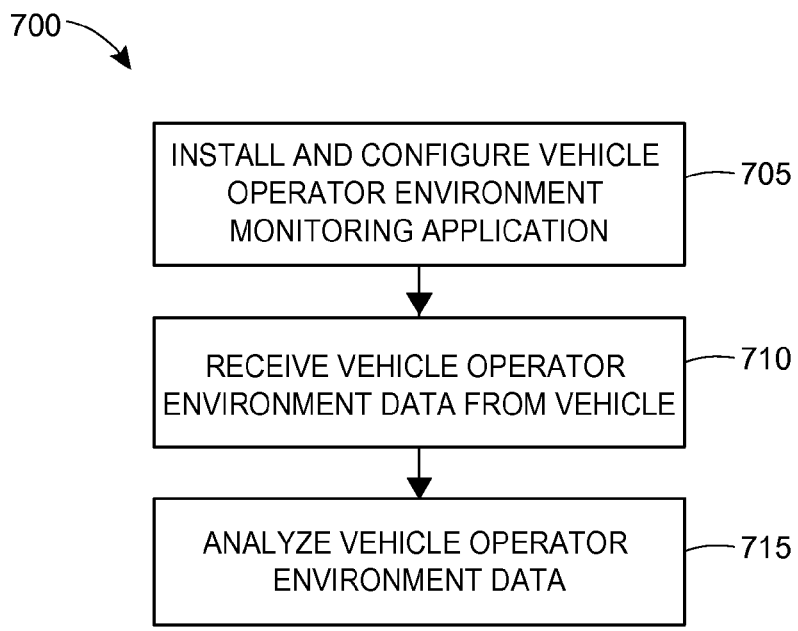
FIG. 7 depicts a flow diagram of an example method of receiving, analyzing and storing vehicle operator monitoring data.

Turning to FIGS. 6 and 7, a remote server 610 of an insurance risk related data collection system 600 is depicted along with a method of establishing an insurance risk related data file on the server 700. The remote server 610 may be similar to the remote server with insurance application 310 of FIG. 3. The method 700 may be implemented by executing the modules 662-664 on a processor (e.g., processor 355). In any event, the remote server 610 may include a vehicle operator environment monitoring module, a vehicle operator environment data receiving module 663 and a vehicle operator environment data analysis module 664 stored on a memory 660. The processor 355 may execute the vehicle operator environment monitoring module 662 to, for example, cause the processor 355 to receive data representative of a 3D model vehicle operator (block 705). The data representative of the 3D model vehicle operator may have been generated, for example, in conjunction with a vehicle safety study and may reflect an ideal position and orientation of a vehicle driver's head and hands. For example, the data representative of a 3D model vehicle operator may indicate that the vehicle operator's left hand is grasping a steering wheel near a minus forty-five degree angle relative to a top of the steering wheel and the vehicle operator's right hand is grasping the steering wheel near a positive forty-five degree angle relative to the top of the steering wheel. Additionally, the data representative of a 3D model vehicle operator may indicate that the vehicle operator's head is oriented such that the operator is looking forward out the front windshield of an associated vehicle. Alternatively, the data representative of the 3D model vehicle operator may reflect a sequence of positions of the model vehicle operator. For example, the 3D model vehicle operator may reflect that the operator is periodically scanning the rearview mirrors while most often looking forward out the front windshield of an associated vehicle.

The processor 355 may execute the vehicle operator environment data receiving module 663 to retrieve position data from a vehicle module (block 710). For example, the processor 355 may retrieve position data and, or sound data from a vehicle module 305. Alternatively, the processor 355 may retrieve data from the vehicle module that is representative of a 3D model of at least a portion of a vehicle driver.

The processor 355 may execute the vehicle operator environment data analysis module 664 to determine a position of at least a portion of a vehicle driver (block 715) based on the retrieved position data. For example, the processor 355 may generate a 3D model of at least a portion of a vehicle driver based on the data acquired from at least one position sensor 336, 337, 341, 342, 346, 347. The processor 355 may also generate an advisory based on a comparison of a 3D model of at least a portion of the vehicle driver and at least a portion of a 3D model vehicle operator. The advisory may be provided to the vehicle driver as a mechanism to inform the vehicle driver how he may improve his driving behavior. Furthermore, the processor 355 may determine a source and, or volume of sound within the vehicle interior based on data received from at least one microphone 351, 352. The processor 355 may also generate an advisor based on the data representative of the sound within the vehicle interior. The advisory may be provided to the vehicle driver as a mechanism to inform the vehicle driver how he may improve his driving behavior. The processor 355 may determine an insurance rate for a particular vehicle driver based, at least in part on position data received from at least one position sensor 336, 337, 341, 342, 346, 347 and, or sound data received from at least one microphone 351, 352. Alternatively, the processor 355 may determine an insurance rate for a particular vehicle driver based, at least in part on the comparison of a 3D model of at least a portion of the vehicle driver and at least a portion of a 3D model vehicle operator.

This detailed description is to be construed as exemplary only and does not describe every possible embodiment, as describing every possible embodiment would be impractical, if not impossible. One could implement numerous alternate embodiments, using either current technology or technology developed after the filing date of this application.

What is claimed is:

1. A computer implemented method for generating data representative of a position of at least a portion of a vehicle driver within an interior of a vehicle and data representative of an operating environment within the vehicle, the method comprising:

acquiring, from one or more data sources, model data, wherein the model data is representative of a model of at least a portion of the interior of the vehicle including at least a portion of a model vehicle operator;

acquiring, from two or more position sensors, vehicle driver position data, wherein a first one of the two or more position sensors is a pressure transducer located within a vehicle driver-side seat, wherein a position of the vehicle driver within the vehicle driver-side seat is inferred from shifting weight on the vehicle driver-side seat, wherein a second one of the two or more position sensors is used to generate a three-dimensional model of a vehicle driver within the interior of the vehicle, and wherein the vehicle driver position data is representative of the position of at least the portion of the vehicle driver within the interior of the vehicle;

comparing, using one or more processors, the vehicle driver position data with the model data; and determining, using one or more processors, a difference between the vehicle driver position data and the model data based on the comparison of the vehicle driver position data with the model data to detect a vehicle driver position.

2. The method of claim 1, further comprising:

generating at least one of: a warning to the vehicle driver that a position of at least a portion of the vehicle driver has deviated from a position of at least a portion of the model vehicle operator and an advisory to the vehicle driver how to correct a deviation of a position of at least a portion of the vehicle driver has deviated from a position of at least a portion of the model vehicle operator.

3. The method of claim 1, wherein the vehicle driver position data is acquired from at least one of: an infrared sensor, an ultrasonic sensor, or an image sensor.

4. The method of claim 1, wherein the vehicle driver position data includes information that is representative of at least one of: a gaze direction of the vehicle driver, an in-car gesture of the vehicle driver, a position of the vehicle driver's head, an orientation of the vehicle driver's head, a position of at least one of the vehicle driver's hands, an orientation of at least one of the vehicle driver's hands, a position of at least one of the vehicle driver's feet or an item within at least one of the vehicle driver's hands.

5. The method of claim 4, wherein the vehicle driver position data includes a time stamp and the information is tracked over time.

6. The method of claim 1, further comprising:

acquiring, from one or more audio sensors, audio data, wherein the audio data is representative of sound within the interior of the vehicle.

7. The method of claim 6, wherein the audio data is indicative of a volume of the sound.

8. A system for generating data representative of a position of at least a portion of a vehicle driver within an interior of a vehicle and data representative of an operating environment within the vehicle using one or more processors, the system comprising:

a model data acquisition module stored on a memory that, when executed by a processor, causes the processor to acquire model data, wherein the model data is representative of a model of at least a portion of the interior of the vehicle including at least a portion of a model vehicle operator;

a position data acquisition module stored on a memory that, when executed by a processor, causes the processor to acquire position data from at least two position sensors, wherein a first one of the at least two position sensors is a pressure transducer located within a vehicle driver-side seat, wherein a position of the vehicle driver within the vehicle driver-side seat is inferred from shifting weight on the vehicle driver-side seat, wherein a second one of the at least two position sensors is used to generate a three-dimensional model of a vehicle driver within the interior of the vehicle, and wherein the position data is representative of the position of at least the portion of the vehicle driver within the interior of the vehicle;

a comparison module stored on a memory that, when executed by a processor, causes the processor to compare the position data with the model data; and a determination module stored on a memory that, when executed by a processor, causes the processor to determine differences between a vehicle driver position and a model vehicle operator position based on the comparison of the position data with the model data to detect a vehicle driver position associated with a vehicle accident.

9. The system of claim 8, further comprising:
a data transmission module stored on a memory that, when executed by a processor, causes the processor to transmit the position data to a remote server.

10. The system of claim 9, wherein the position data includes a time stamp and the information is tracked over time.

11. The system of claim 9, wherein the model data acquisition module and the comparison module are executed by a processor within the remote server.

12. The system of claim 8, wherein the position data includes information that is representative of at least one of: a gaze direction of the vehicle driver, an in-car gesture of the vehicle driver, a position of the vehicle driver's head, an orientation of the vehicle driver's head, a position of at least one of the vehicle driver's hands, an orientation of at least one of the vehicle driver's hands, a position of at least one of the vehicle driver's feet or an item within at least one of the vehicle driver's hands.

13. The system of claim 8, further comprising:
an audio data acquisition module stored on a memory that, when executed by a processor, causes the processor to acquire audio data, wherein the audio data is representative of sound within the interior of the vehicle.

14. A non-transitory, computer-readable medium storing instructions that when executed by a process of a computer system cause the computer system to generate data representative of a position of at least a portion of a vehicle driver within an interior of a vehicle and data representative of an operating environment within the vehicle, the instructions comprising:

a model data acquisition module that, when executed by a processor, causes the processor to acquire model data, wherein the model data is representative of a model of at least a portion of the interior of the vehicle including at least a portion of a model vehicle operator;

a position data acquisition module that, when executed by a processor, causes the processor to acquire position data from at least two position sensors, wherein a first one of the at least two position sensors is a pressure transducer located within a vehicle driver-side seat, wherein a position of the vehicle driver within the vehicle driver-side seat is inferred from shifting weight on the vehicle driver-side seat, wherein a second one of the at least two position sensors is used to generate a three-dimensional model of a vehicle driver within the interior of the vehicle, and wherein the position data is representative of the position of at least the portion of the vehicle driver within the interior of the vehicle;

a comparison module that, when executed by a processor, causes the processor to compare the position data with the model data; and a determination module that, when executed by a processor, causes the processor to determine differences between a vehicle driver position and a model vehicle operator position based on the comparison of the position data with the model data.

15. The non-transitory, computer-readable medium of claim 14, further comprising:
a data transmission module that, when executed by a processor, causes the processor to transmit the position data to a remote server.

16. The non-transitory, computer-readable medium of claim 15, wherein the position data includes a time stamp and the information is tracked over time.

17. The non-transitory, computer-readable medium of claim 15, wherein the model data acquisition module and the comparison module are executed by a processor within the remote server.

18. The non-transitory, computer-readable medium of claim 14, further comprising:
an insurance rate computation module that, when executed by a processor, causes the processor to determine an insurance rate based, at least in part, on the differences between the vehicle driver position and the model vehicle operator position.

19. The non-transitory, computer-readable medium of claim 14, wherein the audio data is representative of a volume of sound within the interior of the vehicle.

20. The non-transitory, computer-readable medium of claim 14, further comprising:
a warning/advisory generation module that, when executed by a processor, causes the processor to generate at least one of: a warning to the vehicle driver that a position of at least a portion of the vehicle driver has deviated from a position of at least a portion of the model vehicle operator and an advisory to the vehicle driver how to correct a deviation of a position of at least a portion of the vehicle driver has deviated from a position of at least a portion of the model vehicle operator.

* * * * *